United States Patent
Tsao et al.

(10) Patent No.: US 11,687,182 B2
(45) Date of Patent: Jun. 27, 2023

(54) DISPLAY APPARATUS

(71) Applicant: Au Optronics Corporation, Hsinchu (TW)

(72) Inventors: Tzu-Yi Tsao, Hsinchu (TW); Pin-Miao Liu, Hsinchu (TW)

(73) Assignee: Au Optronics Corporation, Hsinchu (TW)

( * ) Notice: Subject to any disclaimer, the term of this patent is extended or adjusted under 35 U.S.C. 154(b) by 0 days.

(21) Appl. No.: 17/567,894

(22) Filed: Jan. 4, 2022

(65) Prior Publication Data

US 2022/0129100 A1  Apr. 28, 2022

Related U.S. Application Data

(63) Continuation of application No. 16/596,796, filed on Oct. 9, 2019, now abandoned.

(30) Foreign Application Priority Data

Nov. 26, 2018   (TW) .................................. 107142088

(51) Int. Cl.
*G06F 3/041*   (2006.01)
*G06F 3/044*   (2006.01)

(52) U.S. Cl.
CPC ............ *G06F 3/0412* (2013.01); *G06F 3/044* (2013.01); *G06F 3/0416* (2013.01); *G06F 3/0414* (2013.01)

(58) Field of Classification Search
CPC .... G06F 3/0412; G06F 3/0414; G06F 3/0416; G06F 3/044; G06F 3/0443
See application file for complete search history.

(56) References Cited

U.S. PATENT DOCUMENTS

| | | | |
|---|---|---|---|
| 2012/0069059 A1* | 3/2012 | Lee ....................... | G09G 3/3225 345/76 |
| 2012/0098877 A1* | 4/2012 | Taro ..................... | G09G 3/3225 345/691 |
| 2017/0102797 A1* | 4/2017 | Cok ..................... | G06F 3/0445 |
| 2017/0115784 A1* | 4/2017 | Li ........................ | G02F 1/13338 |
| 2017/0199603 A1* | 7/2017 | Xu ....................... | H01L 27/1255 |
| 2017/0269749 A1* | 9/2017 | Bok ..................... | G06F 3/0412 |
| 2018/0120994 A1* | 5/2018 | Yoo ..................... | G06F 3/0412 |
| 2018/0188861 A1* | 7/2018 | Wu ..................... | H01L 27/1248 |

* cited by examiner

*Primary Examiner* — Ryan A Lubit
(74) *Attorney, Agent, or Firm* — JCIPRNET (57) ABSTRACT

A display apparatus is provided. The display apparatus includes an array substrate, and includes control devices, light emitting diodes (LEDs) and an electrode pattern disposed on the array substrate. The LED includes first and second semiconductor layers, and includes a light emitting layer disposed between the first and second semiconductor layers. The electrode pattern includes first electrodes, second electrodes and touch driving signal lines. Each first electrode is electrically connected with the first semiconductor layer of at least one of the LEDs. Each second electrode is electrically connected with the second semiconductor layer of one of the LEDs and one of the control devices. The touch driving signal lines are respectively disposed between adjacent first electrodes. At least an edge of each first electrode is adjacent to a line section of the touch driving signal lines.

10 Claims, 6 Drawing Sheets

DISPLAY APPARATUS

CROSS-REFERENCE TO RELATED APPLICATION

This application is a continuation application of and claims the priority benefit of a prior application Ser. No. 16/596,796, filed on Oct. 9, 2019, now pending. The prior application Ser. No. 16/596,796 claims the priority benefit of Taiwan application serial no. 107142088, filed on Nov. 26, 2018. The entirety of each of the above-mentioned patent applications is hereby incorporated by reference herein and made a part of this specification.

BACKGROUND

Technical Field

The present disclosure relates to a display apparatus, and particularly, to a display apparatus with touch sensing function.

Description of Related Art

Light emitting diode (LED) has merits of high energy conversion efficiency, short response time, long lifetime and so forth. Accordingly, LED has been comprehensively applied as luminous source that is featured in high power efficiency and less environmental pollution. Furthermore, since dimension of LED has been greatly scaled down, a technique for transferring LEDs onto pixel structures to form a micro-LED display or a mini-LED display has been developed.

On top of that, touch sensing function is regarded as a vital feature of a modern display apparatus. Therefore, integration of touch sensing module with the micro-LED display or the mini-LED display has become an important object in the field of display apparatus.

SUMMARY

Accordingly, a LED display apparatus having touch sensing module integrated therein is provided in the present disclosure.

According to some embodiment of the present disclosure, a display apparatus comprises an array substrate, a plurality of control devices, a plurality of light emitting diodes (LEDs) and an electrode pattern. The plurality of control devices are disposed over the array substrate. The plurality of LEDs are arranged in an array over the array substrate. The plurality of LEDs respectively comprise a first semiconductor layer, a second semiconductor layer and a light emitting layer. The light emitting layer is disposed between the first and second semiconductor layers. The electrode pattern is formed over the array substrate, and comprises a plurality of first electrodes, a plurality of second electrodes and a plurality of touch driving signal lines. Each of the plurality of first electrodes is electrically connected with the first semiconductor layer of at least one of the plurality of LEDs. Each of the plurality of second electrodes is electrically connected with the second semiconductor layer of one of the plurality of LEDs and one of the plurality of control devices. The plurality of touch driving signal lines are respectively disposed between adjacent first electrodes. At least a portion of the plurality of touch driving signal lines extend along a first direction. At least an edge of each of the plurality of first electrodes is adjacent to a line section of the plurality of touch driving signal lines.

In some embodiments, at least a portion of each of the plurality of first electrodes and the plurality of touch driving signal lines are substantially located at the same plane.

In some embodiments, the plurality of first electrodes, the plurality of second electrodes and the plurality of touch driving signal lines are substantially located at the same plane.

In some embodiments, the plurality of first electrodes are not structurally connected with one another.

In some embodiments, each of the plurality of first electrodes is electrically connected with the first semiconductor layers of two or more of the plurality of the light emitting diodes, and another portion of the plurality of touch driving signal lines extend along a second direction, and adjacent ones of the touch driving signal lines extending along the second direction are not connected with each other.

In some embodiments, at least two edges of each of the plurality of first electrodes are adjacent to at least two line sections of the plurality of touch driving signal lines.

In some embodiments, the at least two edges of each of the plurality of first electrodes are substantially parallel with the at least two line sections of the plurality of touch driving signal lines.

In some embodiments, the array substrate further includes a border region, the border region is located in a peripheral region of the array substrate, the touch driving signal lines extending along the first direction further extend into the border region, and each electrically connects with a touch control device.

In some embodiments, a line width of each of the plurality of touch driving signal lines is greater than or equal to 3 μm, and is less than or equal to 50 μm.

In some embodiments, a spacing between adjacent ones of the touch driving signal lines extending along the first direction ranges from 0.5 mm to 5 mm.

In some embodiments, a percentage of an area of one of the plurality of first electrodes located between adjacent line sections of the touch driving signal lines extending along the first direction with respect to an area between these adjacent line sections of the touch driving signal lines ranges from 50% to 90%.

In some embodiments, the electrode pattern comprises a transparent metal film or a transparent conductive material.

As above, electrodes in LEDs of the display apparatus are also functioned as touch sensing electrodes, and such electrodes having both of the display function and the touch sensing function are formed on the array substrate. Additionally, the touch driving signal lines are formed on the array substrate as well. As such, the touch sensing module including the above-mentioned multifunctional electrodes and the touch driving signal lines can be regarded as an in-cell touch sensing module. Furthermore, the touch sensing electrodes and the touch driving signal lines are portions of the same material layer, and are horizontally spaced apart from one another. Accordingly, a position of a touch object can be detected according to the capacitance variation between the horizontally adjacent touch sensing electrodes and touch driving signal lines. As compared to bridging one of the intersecting touch sensing electrode and touch driving signal line cross the other from above, the touch sensing electrodes of the embodiments in the present disclosure are not directly connected with each other. In other words, a bridge structure for connecting adjacent touch sensing electrodes is not required in the embodiments of the present disclosure. Moreover, since the electrodes of the LEDs in the sub-pixel regions of the display apparatus of the embodiments in the present disclosure are further functioned as touch sensing electrodes, thus touch sensing units of the display apparatus can be scaled down to a sub-pixel level. Therefore, when the display apparatus of the embodiments in the present disclosure is operated for sensing pressing force, a resolution of pressing force sensing can be significantly improved.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1A:
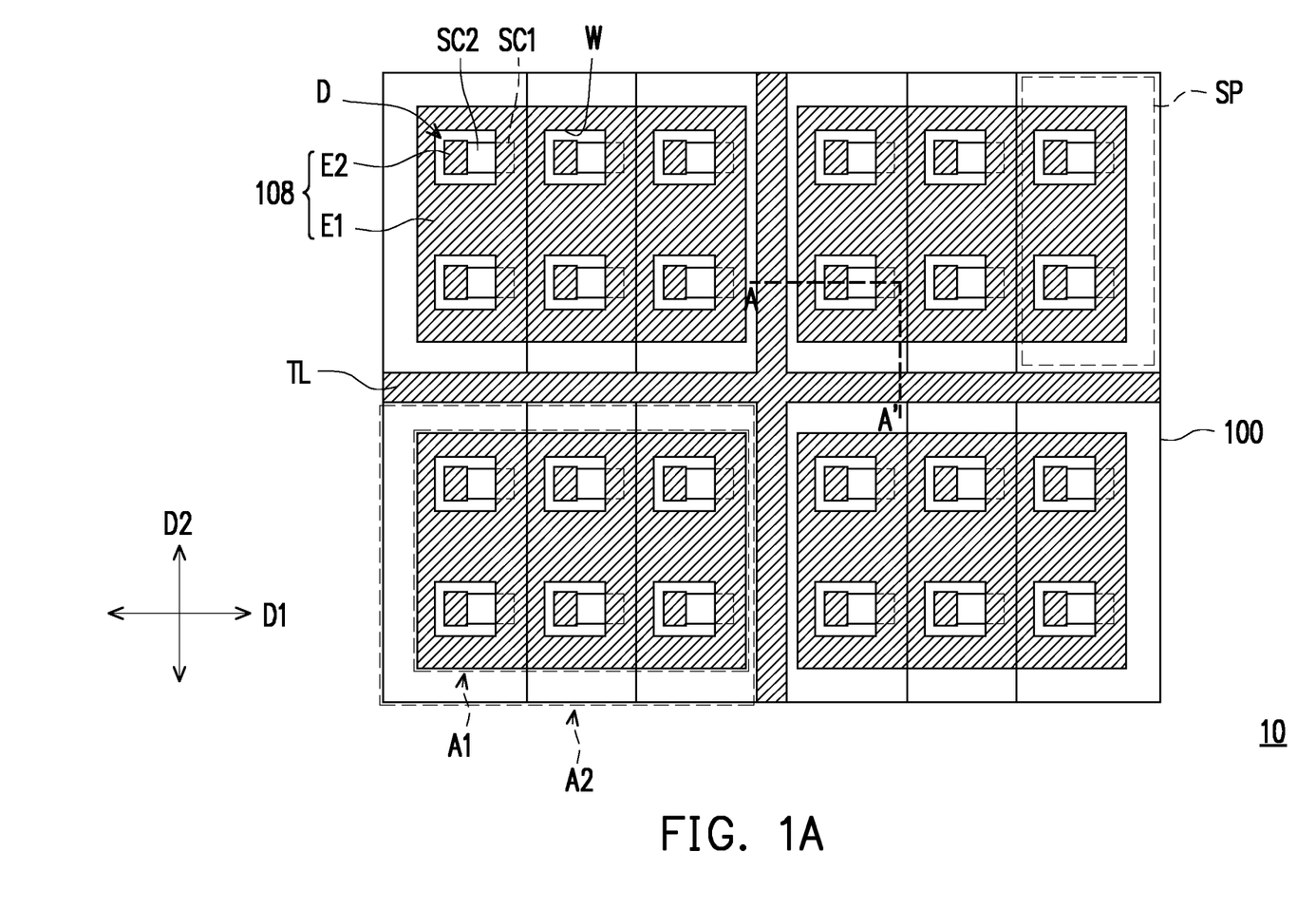
FIG. 1A is a schematic top view illustrating a display apparatus according to some embodiments of the present disclosure.
Figure 1B:
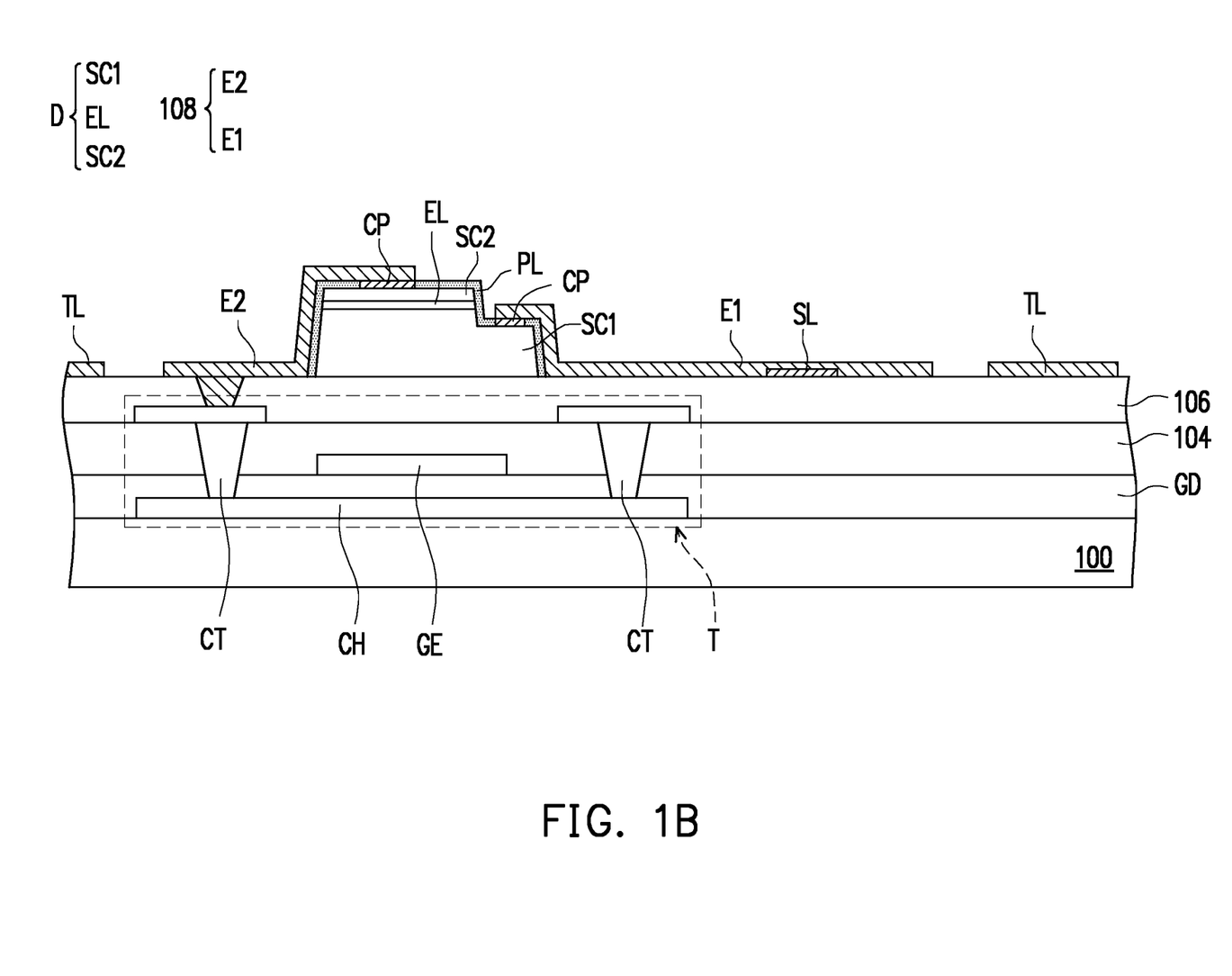
FIG. 1B is a schematic cross-sectional view illustrating a portion of the display apparatus according to some embodiments of the present disclosure.

FIG. 1A is a schematic top view illustrating a display apparatus according to some embodiments of the present disclosure. FIG. 1B is a schematic cross-sectional view illustrating a portion of the display apparatus according to some embodiments of the present disclosure. For instance, FIG. 1B is the schematic cross-sectional view along the line A-A' of FIG. 1A.

Referring to FIG. 1A, a display apparatus 10 of embodiments in the present disclosure includes an array substrate 100, such as a glass substrate or a substrate made of a flexible material (e.g., plastic film or stainless steel). A plurality of light emitting diodes (LEDs) D are disposed over the array substrate 100. In some embodiments, each of the LEDs D may be a micro-LED or a mini-LED. The LEDs D are arranged as an array over the array substrate 100 along a first direction D1 and a second direction D2. The first direction D1 is intersected with the second direction D2. In some embodiments, the first direction D1 is perpendicular with the second direction D2. One or more of the LEDs D may be located within a sub-pixel region SP. In the embodiments shown in FIG. 1A, each of the sub-pixel regions SP includes two of the LEDs D, but the present disclosure is not limited thereto. In those embodiments in which multiple LEDs D are included in one of the sub-pixel regions SP, the LEDs D in each sub-pixel region SP may have substantially the same major wavelength range. In alternative embodiments, the LEDs D in each sub-pixel region SP may have different major wavelength ranges.

Referring to FIG. 1A and FIG. 1B, the display apparatus 10 further includes a plurality of control devices T. The control devices T are disposed over the array substrate 100. The control devices T include active device(s), passive device(s) or a combination thereof. For instance, the active device(s) may be one or more transistor(s), control integrated circuit (IC) or some switching device(s), whereas the passive device(s) may include capacitor(s). In some embodiments, the control device T includes a transistor, which may include a channel layer CH, a gate electrode GE and a dielectric layer GD. The channel layer CH is formed on the array substrate 100. The channel layer CH is covered by the dielectric layer GD, and the gate electrode GE is formed over the dielectric layer GD. A portion of the dielectric layer GD is located between the gate electrode GE and the channel layer CH, and may be functioned as a gate dielectric layer. A portion of the channel layer CH that is overlapped with the gate electrode GE may be functioned as a channel region of the transistor, whereas regions of the channel layer CH that are located at opposite sides of the gate electrode GE may be doped and functioned as source/drain electrodes of the transistor. In some embodiments, one or more insulating layers 104 may be formed over the gate electrode GE. In addition, in some embodiments, the transistor may further include source/drain contact structures CT. The source/drain contact structures CT penetrate the insulating layer 104 and the dielectric layer GD, and electrically connect with the source/drain electrodes of the channel layer CH. However, other configurations of the channel layer CH, the gate electrode GE and the dielectric layer GD of the transistor may be available, the present disclosure is not limited thereto.

Referring to FIG. 1B, in some embodiments, the LED D is disposed over the control device T. In some embodiments, an insulating layer 106 is disposed between the control device T and the LED D. The LED D may include a first semiconductor layer SC1, a second semiconductor layer SC2 and a light emitting layer EL. The first semiconductor layer SC1 and the second semiconductor layer SC2 are sequentially stacked on the insulating layer 106, whereas the light emitting layer EL is disposed between the first semiconductor layer SC1 and the second semiconductor layer SC2. In some embodiments, the LED D may have a mesa structure. In these embodiments, a first portion of the first semiconductor layer SC1 is overlapped with the second semiconductor layer SC2, whereas a second portion of the first semiconductor layer SC1 is not overlapped with the second semiconductor layer SC2. The light emitting layer EL is located between the second semiconductor layer SC2 and the first portion of the first semiconductor layer SC1. In some embodiments, a passivation layer PL may be further formed over the LED D. The passivation layer PL covers a sidewall and some portions of a top surface of the LED D, and other portions of the top surface of the LED D (i.e., top surfaces of the first semiconductor layer SC1 and the second semiconductor layer SC2) are exposed by the passivation layer PL. Conductive pads CP may be respectively formed over the exposed portions of the first semiconductor layer SC1 and the second semiconductor layer SC2.

In alternative embodiments, the LED D and the control device T may be disposed side by side over the array substrate 100 (not shown). In these alternative embodiments, the LED D is not regarded as being located above/below the control device T.

The display apparatus 10 further includes electrode patterns 108. The electrode patterns 108 include a plurality of first electrodes E1 and a plurality of second electrodes E2.

Each first electrode E1 and each second electrode E2 are electrically connected with the first semiconductor layer SC1 and the second semiconductor layer SC2 of at least one of the LEDs D, respectively. In some embodiments, the first electrode E1 is electrically connected with the corresponding first semiconductor layer SC1 via a conductive pad CP. Similarly, the second electrode E2 may be electrically connected with the corresponding second semiconductor layer SC2 via another conductive pad CP. In addition, the second electrode E2 is further electrically connected with at least one of the control devices T. In some embodiments, the first electrode E1 covers a portion of the first semiconductor layer SC1 that is not overlapped with the second semiconductor layer SC2 (i.e., the above-mentioned second portion of the first semiconductor layer SC1), and extends onto a sidewall of this portion of the first semiconductor layer SC1. Moreover, the first electrode E1 further extends onto a portion of the insulating layer 106 at a side of the LED D. On the other hand, the second electrode E2 covers the top surface of the second semiconductor layer SC2, and extends onto the sidewall of the LED D. In some embodiments, the second electrode E2 further extends onto a portion of the insulating layer 106 at another side of the LED D, and may vertically penetrate the insulating layer 106 to electrically connect with the control device T. For instance, the second electrode E2 may be electrically connected to one of the source/drain contact structures CT of the control device T.

In some embodiments, before forming the electrode patterns 108, other circuits SL may be further formed on the array substrate 100 (e.g., on the insulating layer 106). In this way, the circuit SL may be covered by the electrode patterns 108. The circuits SL may be electrically connected with the first electrodes E1 and/or the second electrodes E2, to apply voltages for driving the LEDs D or to transmit other signals. In alternative embodiments, the step of forming the circuits SL may follow the step of forming the electrode patterns 108. In other words, in these embodiments, the circuits SL may be located over the electrode patterns 108.

Referring to FIG. 1A, in some embodiments, each of the electrodes E1 may cover and electrically connect with the first semiconductor layers SC1 of a plurality of the LEDs D. In the embodiments shown in FIG. 1A, each of the first electrodes E1 covers the first semiconductor layers SC1 of 6 of the LEDs D. However, the present disclosure is not limited to the amount of the LEDs D covered by each first electrode E1. In addition, in some embodiments, the first electrodes E1 are not structurally connected with each other. In other words, the first electrodes E1 are not directly connected, and other intervening component(s) may be disposed between adjacent first electrodes E1 (e.g., the touch driving signal line TL described in the following paragraphs). On the other hand, the second electrodes E2 respectively cover the second semiconductor layers SC2 of the LEDs D, and the second electrodes E2 and the underlying second semiconductor layers SC2 are located within a plurality of openings W of the first electrodes E1, respectively. The first electrodes E1 and the second electrodes E2 are not structurally connected with each other. That is, the first electrodes E1 and the second electrodes E2 are not directly connected, and different voltages may be independently supplied to the first semiconductor layers SC1 and the second semiconductor layers SC2 of the LEDs D. Furthermore, regions of the LEDs D that are not covered by the first electrodes E1 and the second electrodes E2 may be regarded as light emitting regions.

Referring to FIG. 1A and FIG. 1B, the electrode patterns 108 further include a plurality of touch driving signal lines TL. Referring to FIG. 1A, some the touch driving signal lines TL may extend along the first direction D1, and others of the touch driving signal lines TL may extend along the second direction D2. Each of the touch driving signal line T1 is disposed between adjacent first electrodes E1. In some embodiments, at least one edge of each first electrode E1 is close to a line section of the touch driving signal lines TL. For instance, as shown in FIG. 1A, at least two edges of each first electrode E1 are respectively close to two line sections of the touch driving signal lines TL. Moreover, the at least one edge of each first electrode E1 is substantially parallel to the line section of the adjacent touch driving signal line TL. Each of the touch driving signal lines T1 may be functioned to transmit touch driving signals, and each of the first electrodes E1 may be functioned as a touch sensing electrode (or referred as a reference electrode), which is configured to receive a reference voltage. When a touch object (e.g., a finger or a stylus pen) approaches or contacts the first electrode E1, a capacitance between this first electrode E1 and the adjacent touch driving signal line TL would be altered. Therefore, a position of the touch object approaching or touching the display apparatus 10 can be detected by monitoring a distribution of the capacitance.

In some embodiments, a line width of each touch driving signal line TL is greater than or equal to 3 μm, and less than or equal to 50 μm. However, those skilled in the art may adjust dimensions of the touch driving signal line TL according to dimensions of the LEDs D and resistance-capacitance (RC) delay, the present disclosure is not limited thereto. In addition, those skilled in the art may modify the amount of the LEDs D being covered by one of the first electrodes E1 according to a size of the touch object. For instance, a rather small coverage area of each first electrode E1 is required for accurately sensing a location of the touch object with a rather small size. On the other hand, a rather large coverage area of each first electrode E1 is required for the touch object with a rather large size. In some embodiments, a spacing between adjacent line sections of the touch driving signal lines TL that are extending along the first direction D1 may range from 0.5 mm to 5 mm. In these embodiments, a minimum length of each first electrode E1 along the second direction D2 may be less than a length of one of the sub-pixel regions SP, and a maximum length of each first electrode E1 along the second direction D2 may be equal to a total length of a plurality of the sub-pixel regions SP. For instance, the length of each first electrode E1 along the second direction D2 may range from 10 μm to 10 mm. Moreover, in some embodiments, a percentage of an area A1 of one of the first electrodes E1 located between adjacent line sections of the touch driving signal lines TL extending along the first direction D1 (or the second direction D2) with respect to an area A2 between these adjacent line sections of the touch driving signal lines TL may range from 50% to 90%.

Referring to FIG. 1B, in some embodiments, the touch driving signal line TL may be disposed over the insulating layer 106. In addition, in some embodiments, a single lithography process is performed for forming the first electrode E1, the second electrode E2 and the touch driving signal line TL. That is, the first electrode E1, the second electrode E2 and the touch driving signal line TL may be regarded as portions of the same conductive material layer. In these embodiments, this conductive material layer is formed over the insulating layer 106 and the LED D. In some embodiments, this conductive material layer may be a metal film. This metal film has a very small thickness (such as less than 0.05 μm), and is substantially transparent. In alternative embodiments, this conductive material layer may include a transparent conductive material, such as indium-tin oxide (ITO), indium-zinc oxide, zinc oxide, tin oxide, the like or combinations thereof. Thereafter, a patterning process is performed on this conductive material layer, so as to form the first electrode E1, the second electrode E2 and the touch driving signal line TL. In some embodiments, referring to FIG. 1B, at least a portion of each first electrode E1 and the touch driving signal line TL are substantially located at the same plane. Similarly, at least a portion of each second electrode E2 and the touch driving signal line TL are substantially located at the same plane.

Figure 2A:
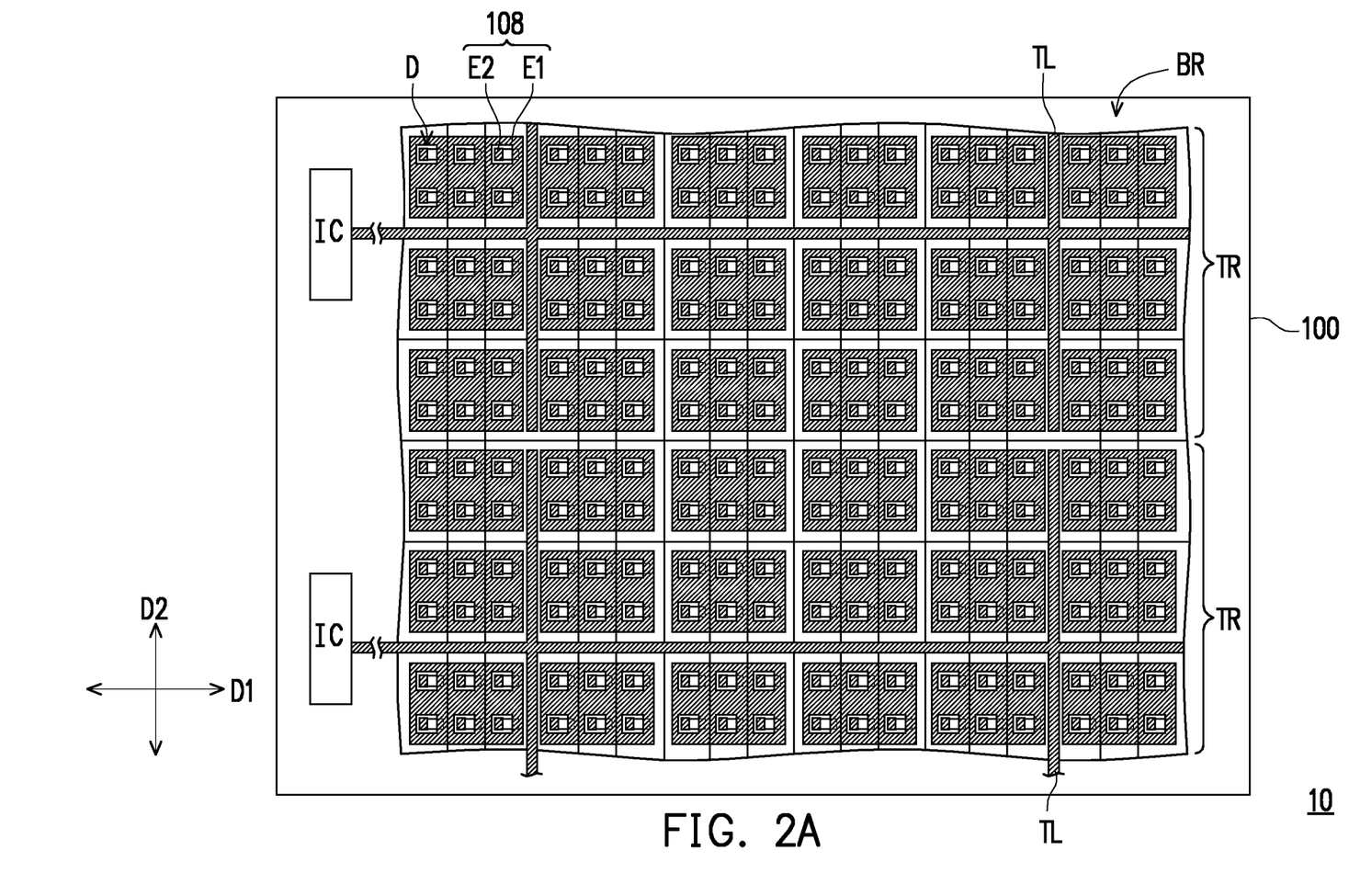
FIG. 2A and FIG. 2B are schematic top views respectively illustrating multiple touch regions of a display apparatus according to some embodiments of the present disclosure.

FIG. 2A is a schematic top view illustrating touch regions TR of the display apparatus 10 according to some embodiments of the present disclosure.

Referring to FIG. 2A, the display apparatus 10 may include a plurality of touch regions TR. It should be noted that, the touch regions TR not only have a touch sensing function, but also has a display function. Therefore, the touch regions TR may also be referred as display regions. In the embodiments shown in FIG. 2A, the touch regions TR are arranged along the second direction D2. Adjacent touch regions TR are not directly connected with each other. Specifically, the line sections of the touch driving signal lines TL extending along the second direction D2 are discontinuous at a boundary between adjacent touch regions TR, and the adjacent touch regions TR are not connected with one another. Thereby, the touch driving signal lines TL in each touch region TR may independently transmit touch driving signals, and interference of the touch driving signals transmitted in different touch regions TR can be avoided.

In some embodiments, the array substrate 100 further includes a border region BR. The border region BR is located within a peripheral region of the array substrate 100, and the touch regions TR (or referred as display regions) are surrounded by the border region BR. A plurality of touch control devices IC are disposed in the border region BR. The touch driving signal lines TL in each touch region TR may be electrically connected with one of the touch control devices IC. In the embodiments shown in FIG. 2A, the line section of the touch driving signal lines TL extending along the first direction D1 in each touch region TR is electrically connected to the corresponding touch control device IC. In addition, in some embodiments, the touch control devices IC may be disposed at the same side of the touch regions TR adjacent to the touch control devices IC along the first direction D1. In alternative embodiments, the touch control devices IC may be disposed at this adjacent side and an opposite side of the touch regions TR, or may be alternately disposed at these opposite sides of the touch regions TR along the second direction D2.

Figure 2B:
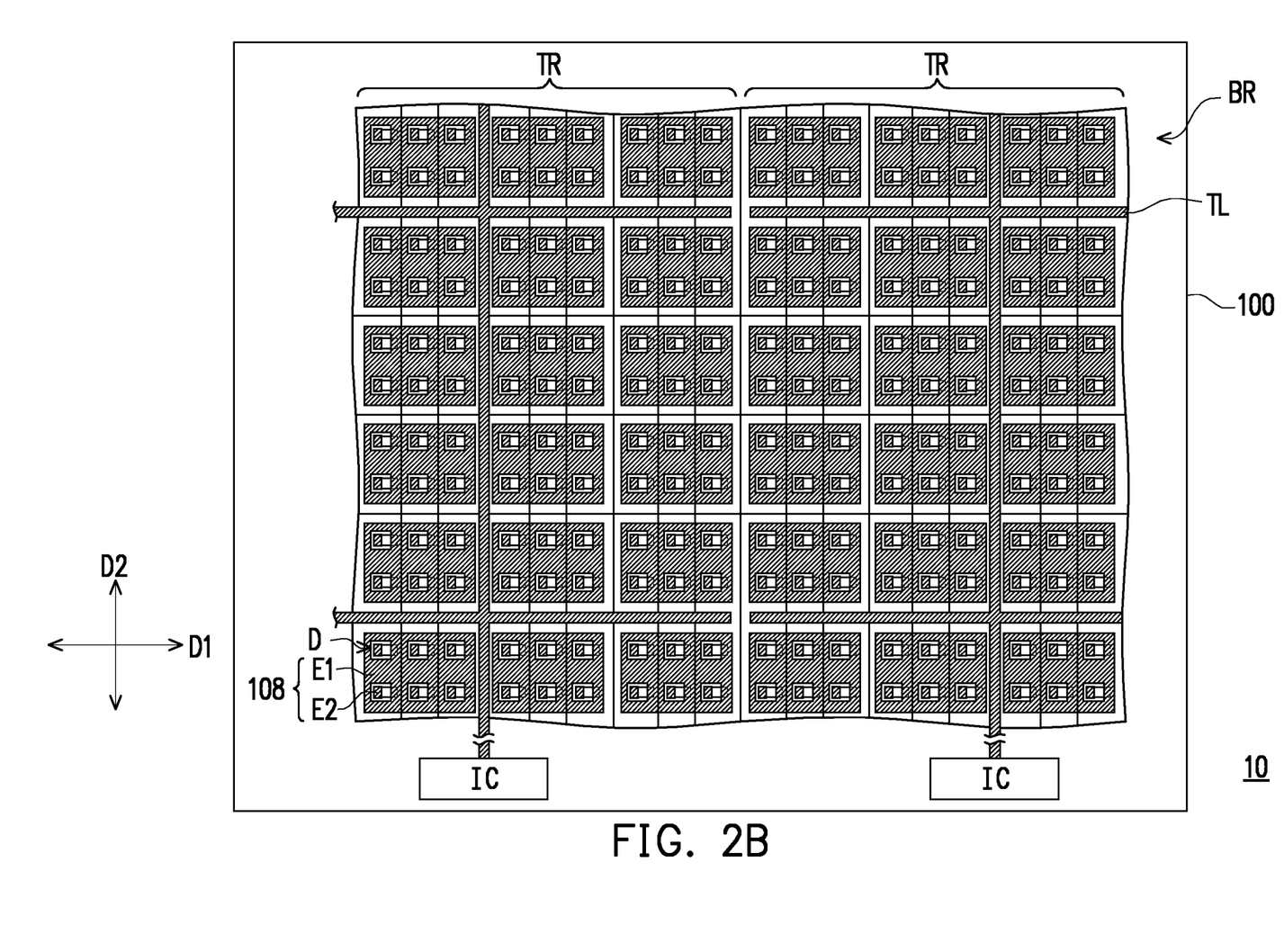

FIG. 2B is a schematic top view illustrating the touch regions TR of the display apparatus 10 according to some embodiments of the present disclosure. The display apparatus 10 shown in FIG. 2B is similar to the display apparatus 10 shown in FIG. 2A, only the differences therebetween will be described, the same or the like parts will not be repeated again.

Referring to FIG. 2B, the touch regions TR are arranged along the first direction D1. In these embodiments, the line sections of the touch driving signal lines TL extending along the first direction D1 are discontinuous at a boundary between adjacent touch regions TR, and the adjacent touch regions TR are not connected with one another. In addition, the touch control devices IC may be disposed at the same side of the touch regions TR adjacent to the touch control devices IC along the second direction D2. In alternative embodiments, the touch control devices IC may be disposed at this adjacent side and an opposite side of the touch regions TR, or may be alternately disposed at these opposite sides of the touch regions TR along the first direction D1.

Figure 3:
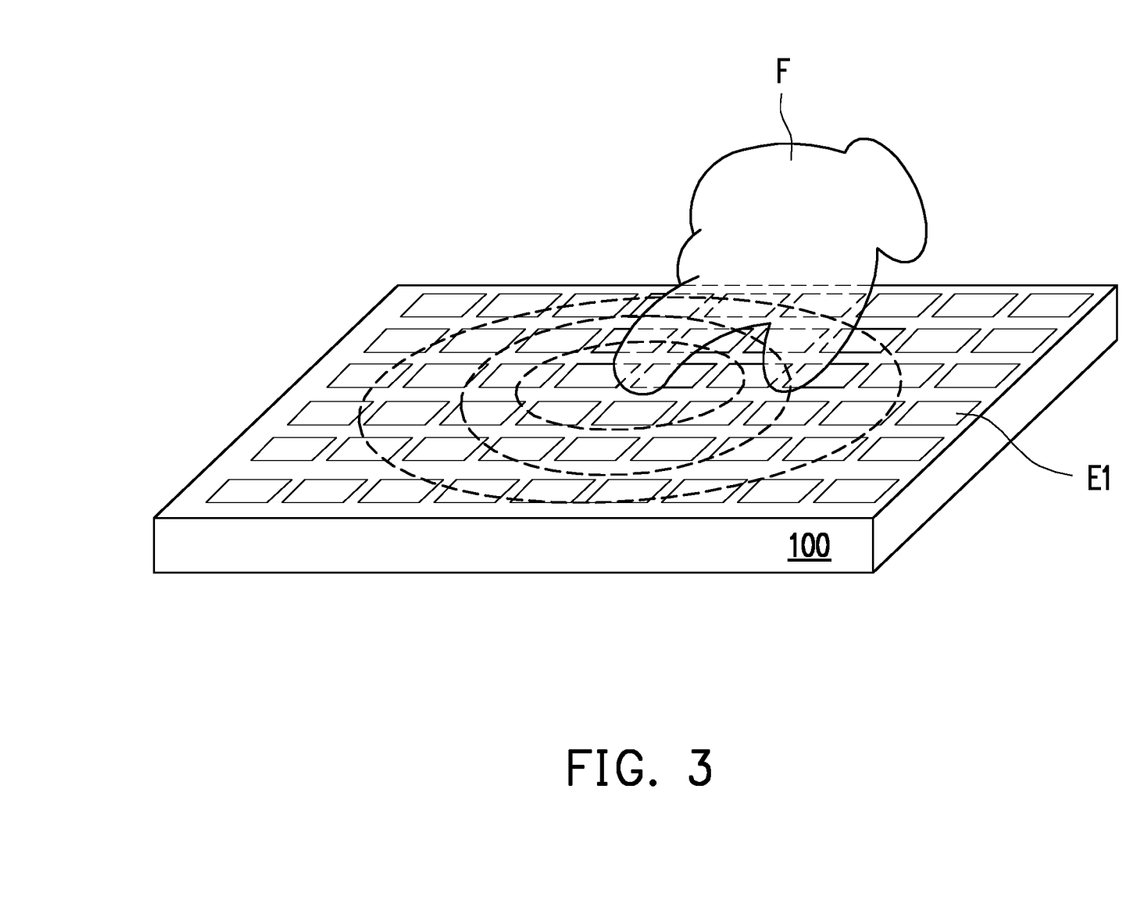
FIG. 3 is a schematic view illustrating capacitive pressing force sensing function of the display apparatus according to some embodiments of the present disclosure.

FIG. 3 is a schematic view illustrating capacitive pressing force sensing function of the display apparatus 10 according to some embodiments of the present disclosure. For clarification, only the first electrodes E1 and the array substrate 100 are depicted in FIG. 3, and some components (e.g., the touch driving signal lines TL etc.) of the display apparatus 10 are omitted. In addition, the first electrodes E1 are not directly connected with one another (as shown in FIG. 1A, FIG. 2A and FIG. 2B).

Referring to FIG. 1 through FIG. 3, the display apparatus 10 of the embodiments in the present disclosure may be used for capacitive pressing force sensing applications. Referring to FIG. 3, when a touch object F (e.g., a finger or a stylus pen held by a hand) contacts the display apparatus 10, a contact area of this touch object F and the display apparatus 10 increases with the pressing force of the touch object F. Correspondingly, an area where the capacitance is altered enlarges as the pressing force of the touch object F increases, and such area variation is illustrated as the dash circles in FIG. 3. In this way, the pressing force of the touch object F can be inferred from the variation of the area where the capacitance is altered. In the embodiments of the present disclosure, the electrodes (e.g., the first electrodes E1) of the LEDs in the sub-pixel regions of the display apparatus are further functioned as touch sensing electrodes, thus sensing units of the display apparatus can be scaled down to a sub-pixel level. For instance, an area of each touch sensing electrode may equal to an area of several sub-pixel regions, such as ranging from 0.5 mm$^2$ to 1.0 mm$^2$. However, the present disclosure is not limited to the area of each sensing electrode. As above, based on the configuration of the first electrodes E1 and the touch driving signal lines TL, the display apparatus 10 of the embodiments in the present disclosure may have both of the functions of display and touch sensing. Even though the display apparatus 10 has both of the display function and the touch sensing function, an aperture ratio of the display apparatus 10 is not compromised, and a manufacturing method of the display apparatus 10 does not become very complicated. Particularly, the display apparatus 10 has a very high resolution for the capacitive pressing force sensing.

Figure 4:
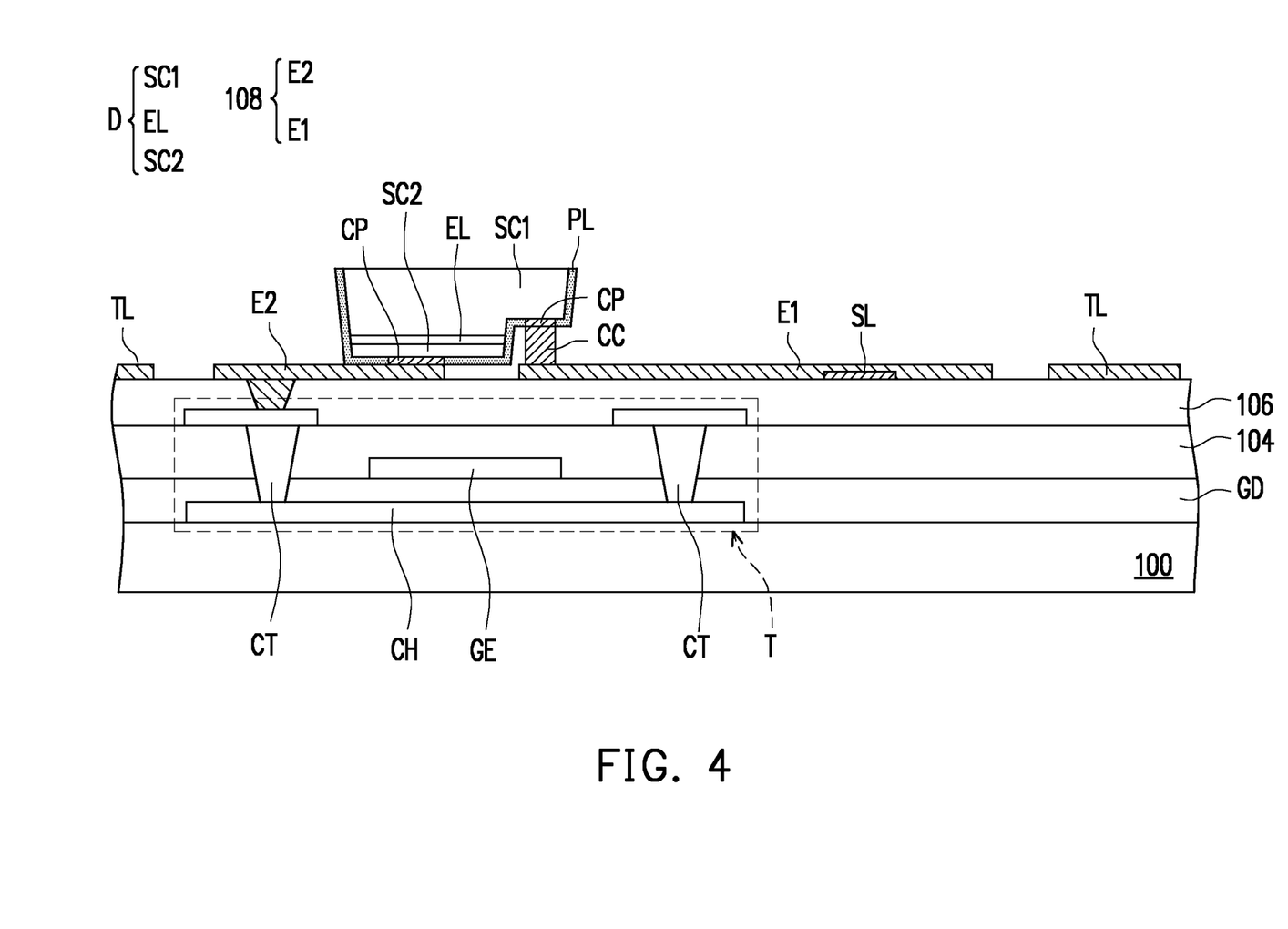
FIG. 4 is a schematic cross-sectional view illustrating a portion of a display apparatus according to some other embodiments of the present disclosure.

FIG. 4 is a schematic cross-sectional view illustrating a portion of the display apparatus according to some other embodiments of the present disclosure. The display apparatus shown in FIG. 4 is similar to the display apparatus shown in FIG. 1B, only the differences therebetween will be described, the same or the like parts will not be repeated again.

Referring to FIG. 4, in some embodiments, the LED D is attached onto the array substrate 100 by a method of flip chip bonding. For instance, the LED D may be attached onto the insulating layer 106 by the method of flip chip bonding. In these embodiments, the second semiconductor layer SC2 is covered by the first semiconductor layer SC1. The first semiconductor layer SC1 has a first portion that is overlapped with the second semiconductor layer SC2, and has a second portion that is not overlapped with the second semiconductor layer SC2. The light emitting layer EL is disposed between the first portion of the first semiconductor layer SC1 and the second semiconductor layer SC2. In addition, the electrode patterns 108 are disposed between the LED D and the array substrate 100. In some embodiments, the electrode patterns 108 are disposed over the insulating layer 106, and the LED D is disposed over the first electrode E1 and the second electrode E2 of the electrode patterns 108. The first electrode E1 is electrically connected with a portion (i.e., the above-mentioned second portion) of the first semiconductor layer SC1 that is not overlapped with the second semiconductor layer SC2. In some embodiments, the first semiconductor layer SC1 and the first electrode E1 are electrically connected through a conductive pad CP and a conductive structure CC. The conductive structure CC may be formed between the first electrode E1 and the conductive pad CP. On the other hand, the second electrode E2 is electrically connected with the second semiconductor layer SC2. In some embodiments, the second semiconductor layer SC2 and the second electrode E2 may be electrically connected through a conductive pad CP.

As indicated by FIG. 4, the LEDs D are disposed over the electrode patterns 108, and the first electrodes E1, the second electrodes E2 and the touch driving signal lines TL may be substantially located at the same plane.

According to the embodiments in the present disclosure, electrodes in LEDs of the display apparatus are also functioned as touch sensing electrodes, and such electrodes having both of the display function and the touch sensing function are formed on the array substrate. Additionally, the touch driving signal lines are formed on the array substrate as well. As such, the touch sensing module including the above-mentioned multifunctional electrodes and the touch driving signal lines can be regarded as an in-cell touch sensing module. Furthermore, the touch sensing electrodes and the touch driving signal lines are portions of the same material layer, and are horizontally spaced apart from one another. Accordingly, a position of a touch object can be detected according to the capacitance variation between the horizontally adjacent touch sensing electrodes and touch driving signal lines. As compared to bridging one of the intersecting touch sensing electrode and touch driving signal line cross the other from above, the touch sensing electrodes of the embodiments in the present disclosure are not directly connected with each other. In other words, a bridge structure for connecting adjacent touch sensing electrodes is not required in the embodiments of the present disclosure. Moreover, since the electrodes of the LEDs in the sub-pixel regions of the display apparatus of the embodiments in the present disclosure are further functioned as touch sensing electrodes, thus touch sensing units of the display apparatus can be scaled down to a sub-pixel level. Therefore, when the display apparatus of the embodiments in the present disclosure is operated for sensing pressing force, a resolution of pressing force sensing can be significantly improved.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A display apparatus, comprising:
   an array substrate;
   a plurality of control devices, disposed over the array substrate;
   a plurality of light emitting diodes, arranged over the array substrate, wherein the plurality of light emitting diodes respectively comprise:
   a first semiconductor layer and a second semiconductor layer; and
   a light emitting layer, disposed between the first semiconductor layer and the second semiconductor layer; and
   an electrode pattern, formed over the array substrate, and comprising:
   a plurality of first electrodes, wherein each of the plurality of first electrodes is electrically connected with the first semiconductor layer of at least one of the plurality of light emitting diodes;
   a plurality of second electrodes, wherein each of the plurality of second electrodes is electrically connected with the second semiconductor layer of one of the plurality of light emitting diodes and one of the plurality of control devices; and
   a plurality of touch driving signal lines, respectively disposed between adjacent first electrodes, wherein at least a portion of the plurality of touch driving signal lines extend along a first direction, and at least an edge of each of the plurality of first electrodes is adjacent to a line section of the plurality of touch driving signal lines, and wherein a bottom surface of each of the plurality of first electrodes, a bottom surface of each of the plurality of second electrodes and a bottom surface of each of the plurality of touch driving signal lines are substantially located at the same plane; and
   wherein each of the plurality of touch driving signal lines is configured to transmit touch driving signals, and each of the plurality of first electrodes is configured to receive a reference voltage, and the display apparatus is configured to monitor a distribution of a capacitance between the touch driving signal lines and an adjacent first electrode.

2. The display apparatus of claim 1, wherein the plurality of first electrodes are not structurally connected with one another.

3. The display apparatus of claim 1, wherein each of the plurality of first electrodes is electrically connected with the first semiconductor layers of two or more of the plurality of the light emitting diodes, and another portion of the plurality of touch driving signal lines extend along a second direction, and adjacent ones of the touch driving signal lines extending along the second direction are not connected with each other.

4. The display apparatus of claim 3, wherein the array substrate further includes a border region, the border region is located in a peripheral region of the array substrate, the touch driving signal lines extending along the first direction further extend into the border region, and each electrically connects with a touch control device.

5. The display apparatus of claim 1, wherein at least two edges of each of the plurality of first electrodes are adjacent to at least two line sections of the plurality of touch driving signal lines.

6. The display apparatus of claim 5, wherein the at least two edges of each of the plurality of first electrodes are substantially parallel with the at least two line sections of the plurality of touch driving signal lines.

7. The display apparatus of claim 1, wherein a line width of each of the plurality of touch driving signal lines is greater than or equal to 3 μm, and is less than or equal to 50 μm.

8. The display apparatus of claim 1, wherein a spacing between adjacent ones of the touch driving signal lines extending along the first direction ranges from 0.5 mm to 5 mm.

9. The display apparatus of claim 1, wherein a percentage of an area of one of the plurality of first electrodes located between adjacent line sections of the touch driving signal lines extending along the first direction with respect to an area between these adjacent line sections of the touch driving signal lines ranges from 50% to 90%.

10. The display apparatus of claim 1, wherein the electrode pattern comprises a transparent metal film or a transparent conductive material.

* * * * *